(12) United States Patent
Wei et al.

(10) Patent No.: US 7,088,850 B2
(45) Date of Patent: Aug. 8, 2006

(54) SPATIAL-TEMPORAL LESION DETECTION, SEGMENTATION, AND DIAGNOSTIC INFORMATION EXTRACTION SYSTEM AND METHOD

(75) Inventors: Guo-Qing Wei, Plainsboro, NJ (US); Jian-Zhong Qian, Princeton Junction, NJ (US); Li Fan, Belle Mead, NJ (US); Cheng-Chung Liang, West Windsor, NJ (US)

(73) Assignee: Edda Technology, Inc., Princeton Junction, NJ (US)

( * ) Notice: Subject to any disclaimer, the term of this patent is extended or adjusted under 35 U.S.C. 154(b) by 0 days.

(21) Appl. No.: 11/106,271

(22) Filed: Apr. 14, 2005

(65) Prior Publication Data

US 2005/0232474 A1 Oct. 20, 2005

Related U.S. Application Data

(60) Provisional application No. 60/562,259, filed on Apr. 15, 2004.

(51) Int. Cl.
*G06K 9/00* (2006.01)
*G06K 9/32* (2006.01)

(52) U.S. Cl. .................................. 382/128; 382/294
(58) Field of Classification Search ........ 382/128–134, 382/294
See application file for complete search history.

(56) References Cited

U.S. PATENT DOCUMENTS

| 5,337,231 | A | * | 8/1994 | Nowak et al. ............... 600/425 |
| 5,690,106 | A | * | 11/1997 | Bani-Hashemi et al. .... 600/425 |
| 6,241,677 | B1 | * | 6/2001 | Guracar et al. ............. 600/453 |
| 6,317,617 | B1 | * | 11/2001 | Gilhuijs et al. ............. 600/408 |
| 2004/0047498 | A1 | * | 3/2004 | Mulet-Parada et al. ..... 382/128 |

* cited by examiner

*Primary Examiner*—Jingge Wu
*Assistant Examiner*—Shefali Patel
(74) *Attorney, Agent, or Firm*—McDermott Will & Emery LLP

(57) ABSTRACT

Method and system for lesion detection is disclosed. A lesion is detected from each data set in the spatial domain based on an organ intensity subtracted (OIST) image. In the temporal domain, the lesion is detected based on a maximum frequency-magnitude difference (MFMD) map across a plurality of data sets. The detection result from the spatial domain and the detection result from the temporal domain are integrated to produce an integrated lesion detection result.

44 Claims, 9 Drawing Sheets

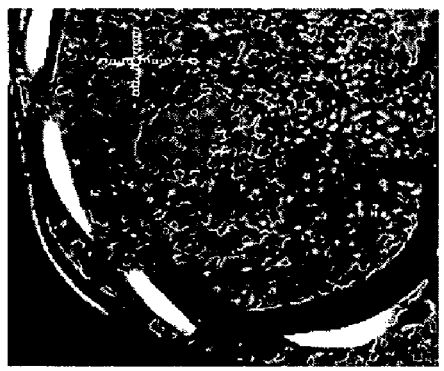
Fig. 8(a)
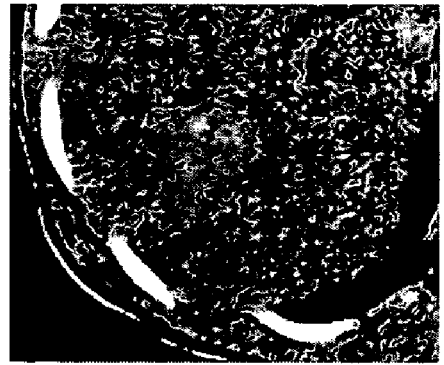
Fig. 8(b)
Fig. 8(c)
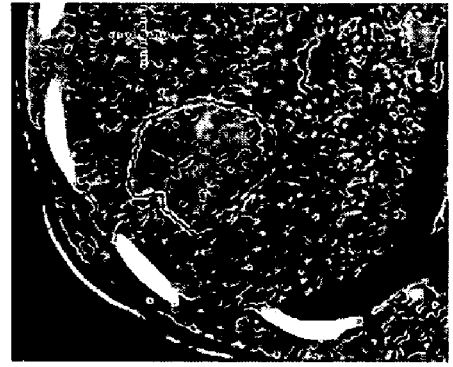
Fig. 8(d)
Fig.8

SPATIAL-TEMPORAL LESION DETECTION, SEGMENTATION, AND DIAGNOSTIC INFORMATION EXTRACTION SYSTEM AND METHOD

The present invention claims priority of provisional patent application No. 60/562,259 filed Apr. 15, 2004, the contents of which are incorporated herein in their entirety.

BACKGROUND OF THE INVENTION

1. Field of the Invention

The present invention relates generally to a system and method for medical image processing. Specifically, the present invention relates to a method and system for computer assisted medical diagnosis and systems incorporating the present invention.

2. Description of Related Art

The process of diagnosing a lesion/cancer is complex and often requires consideration of different types of diagnostic information extracted from different sources such as diagnostic images. Such diagnostic images may be acquired in different modalities such as Ultrasound (US), Computerized Tomography (CT), or Magnetic Resonance Imaging (MRI). Each image modality may offer different insight regarding a disease and provide distinct medical evidence that can be used to reach a diagnosis. Even with such information afforded by modern technologies, diagnosis of lesion/cancer in some organs such as liver lesion/cancer has still proven to be a significant challenge. One important reason relates to the fact that the same disease may appear visually different in diagnostic images of different modalities and different diseases may appear to be similar across images of different modalities. As a consequence, non-cancer liver diseases are sometimes confused with liver cancer diseases and vice versa. For example, non-cancer liver diseases such as Hemangioma, Heptatocellular Adenoma, and Focal Nodular Hyperplasia (FNH) may sometimes appear to be liver cancer.

Given those difficulties in processing data from various modalities, reaching a medical diagnosis based on such data often requires substantial clinical experience. The accuracy of the diagnosis and the amount of time spent to reach a correct diagnosis may also vary considerably from radiologist to radiologist. Tools are needed to facilitate automatic detection of lesion/cancer and extraction of useful diagnostic information to improve throughput and efficiency of a process for diagnosing lesion/cancer.

BRIEF DESCRIPTION OF THE DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 8($a$) and 8($b$) show images acquired at two different slice locations of a region of interest containing a lesion;

FIGS. 8($c$) and 8($d$) show lesion boundaries superimposed on images of regions of interest containing a lesion segmented using a spatial temporal integrated approach according to an embodiment of the present invention.

DETAILED DESCRIPTION

The present invention relates to methods and systems for lesion detection, segmentation, and feature extraction. Methods and systems are disclosed herein that enable integrated spatial temporal processing of imagery information facilitating identification of a lesion contained therein and quantification thereof. In some embodiments, an OIST (organ intensity subtraction) image derived from an image may be used to detect a lesion with a homogeneous intensity distribution. For example, when an organ under a patient study is a liver, then a liver intensity subtraction (LIST) image may be obtained from an image containing a liver. An MFMD map derived from the same image may be used to detect a lesion with an inhomogeneous intensity distribution. An OIST based detection result may be combined with an MFMD based detection result to generate an integrated spatial domain lesion detection result. In some embodiments, a lesion may also be detected in the temporal domain based on an organ weighted registration scheme.

A spatial domain lesion detection result may be verified in the temporal domain using a temporal domain lesion detection result. A temporal domain lesion detection result may be verified in the spatial domain using a spatial domain lesion detection result. A verified spatial domain lesion detection result may be integrated with a verified temporal domain lesion detection result to yield a fused lesion detection result. In some embodiments, a lesion candidate contained in a fused lesion detection result may be further segmented using a hybrid map generated based on an OIST map and an MFMD map computed with respect to the lesion candidate. Features of a segmented lesion that are relevant to the diagnosis of a disease may be automatically extracted.

Figure 1:
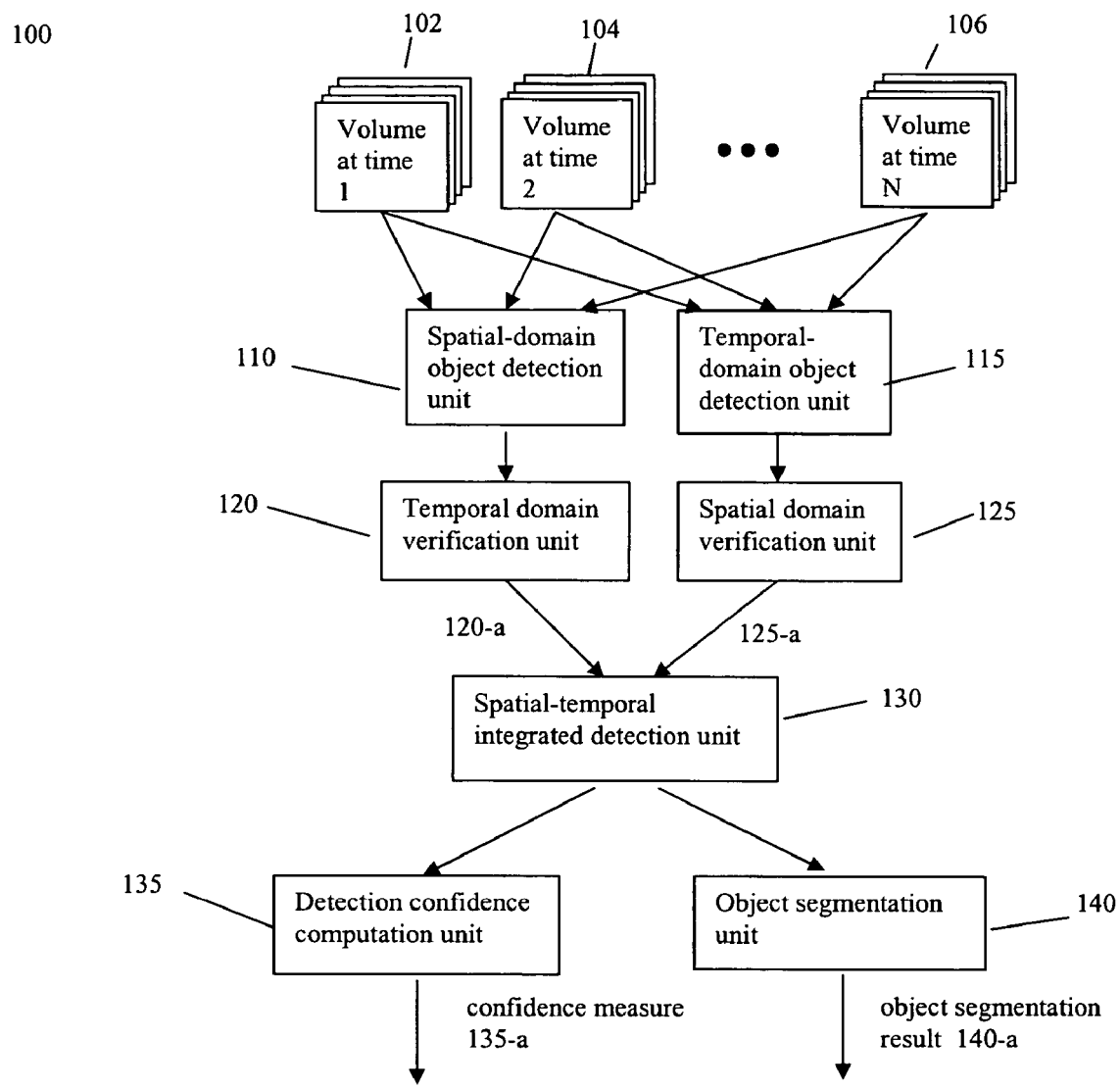
FIG. 1 depicts an exemplary construct of a system for a spatial temporal data process, according to an embodiment of the present invention.

FIG. 1 depicts an exemplary construct of a system 100 for a spatial temporal data process, according to an embodiment of the present invention. The exemplary system 100 comprises a spatial domain object detection unit 110, a temporal domain object detection unit 115, a temporal domain verification unit 120, a spatial domain verification unit 125, a spatial temporal integrated detection unit 130, a confidence computation unit 135, and an object segmentation unit 140. In its operation, the system 100 processes data from a plurality of data sets 102, 104, . . . , 106 and generates an object segmentation result 140-$a$. Different data sets 102,

104, . . . , 106 may relate to each other. For example, these different data sets may be acquired with respect to the same entity such as a patient at different points of time or from different phases. Each data set has a certain dimension. For instance, each data set may be a volumetric data set corresponding to a 3D volume of a certain modality and acquired via MRI imaging. Each data set may also correspond to a two dimensional (2D) image of a certain modality. These data sets may contain one or more objects of interest. Such an object of interest may be a lesion in an organ such as a lesion/cancer in a liver. The data sets 102, 104, . . . , 106 may be accessible or retrievable locally or remotely.

In some embodiments, to extract an object of interest based on information contained in the data set 102, 104, . . . , 106, the spatial domain object detection unit 110 and the temporal domain object detection unit 115 may independently perform object detection. The former may perform object detection in the spatial domain with respect to each individual data set. The latter may perform object detection in the temporal domain based on the data sets that are related along a temporal line. In some embodiments, a detection result may be a location in the data set(s) representing, for example, a center of mass of an object (e.g., a lesion in a liver). Such a detected location may be treated as a candidate for the object of interest. More than one candidate may be detected. Candidate(s) detected by the spatial domain object detection unit 110 may or may not be overlap with candidate(s) detected by the temporal domain object detection unit 115.

In the system 100, each candidate detected by the spatial domain object detection unit 110 may be cross-validated or verified by the temporal domain verification unit 120, in the temporal domain, for example, using temporal evidence or a temporal domain detection result from the temporal domain object detection unit 115. For example, lesion candidates detected in the spatial domain may be verified based on knowledge related to intensity enhancement patterns of different types of lesions. Such verified candidate(s) constitute a spatial domain detection result 120-*a*. Similarly, each candidate detected by the temporal domain object detection unit 115 may be cross-validated or verified, by the spatial domain verification unit 125, using spatial evidence or the detection result from the spatial domain object detection unit 110. For example, lesion candidates detected in the temporal domain may be verified based on knowledge related to expected shape or size of a particular type of lesion. Such verified candidate(s) constitute a temporal domain detection result 125-*a*.

In some embodiments, the spatial domain detection result 120-*a* and the temporal domain detection result 125-*a* are forwarded to the spatial-temporal integrated detection unit 130 where detection results from spatial and temporal domains are integrated to produce an integrated object detection result 130-*a*, which may include one or more detected object candidates, represented, for example, by their corresponding locations. The integrated detection result may also include various measures that characterize each of the detected candidates.

In some embodiments, the integration may be carried out through an OR operation on the spatial domain detection result 120-*a* and the temporal domain detection result 125-*a*. For instance, when a candidate is present only in one set, the integrated detection result may include the candidate. In some situations, two candidates, each of which are from a different set, are located close to each other, even though they do not coincide, they may actually correspond to the same lesion. This may be determined based on features associated with each candidate. For example, corresponding size or boundary measures of each candidate may be used to determine whether lesions associated with the candidate locations substantially overlap. If so, the two candidates from the spatial and temporal detection result sets may be merged to yield an update candidate, with a location estimated, e.g., as the middle point of the two merged candidates. Alternatively, the integration may also be performed using an AND operation and a candidate from one detection result may be retained only when a candidate from the other detection result represents the same lesion. Other schemes may also be employed to integrate the spatial domain detection result 120-*a* with the temporal domain detection result 125-*a* and generate the integrated detection result 130-*a*.

In some embodiments, for each candidate from the integrated detection result 130-*a*, the confidence computation unit 135 may derive a confidence measure 135-*a*, which may indicate a level of likelihood that there is an object of interest at the underlying candidate location. Such a confidence measure may be computed based on different types of information. For example, conformity between certain features of each candidate (e.g., shape of the boundary or intensity profile) and the corresponding expectation of such features may be considered. As another example, when a candidate is present in both the spatial and temporal detection results, this may give rise to a higher degree of confidence in the candidate. Confidence may be computed with respect to different categories of features (e.g., shape, intensity distribution, and intensity change patterns) and may then be combined to derive an overall confidence.

Based on the integrated object detection result 130-*a*, the object segmentation unit 140 may further perform object segmentation with respect to each candidate and extract features relevant to medical diagnosis based on the segmentation result 140-*a*. Detailed flows related to different aspects of the system 100 are discussed below.

Figure 2:
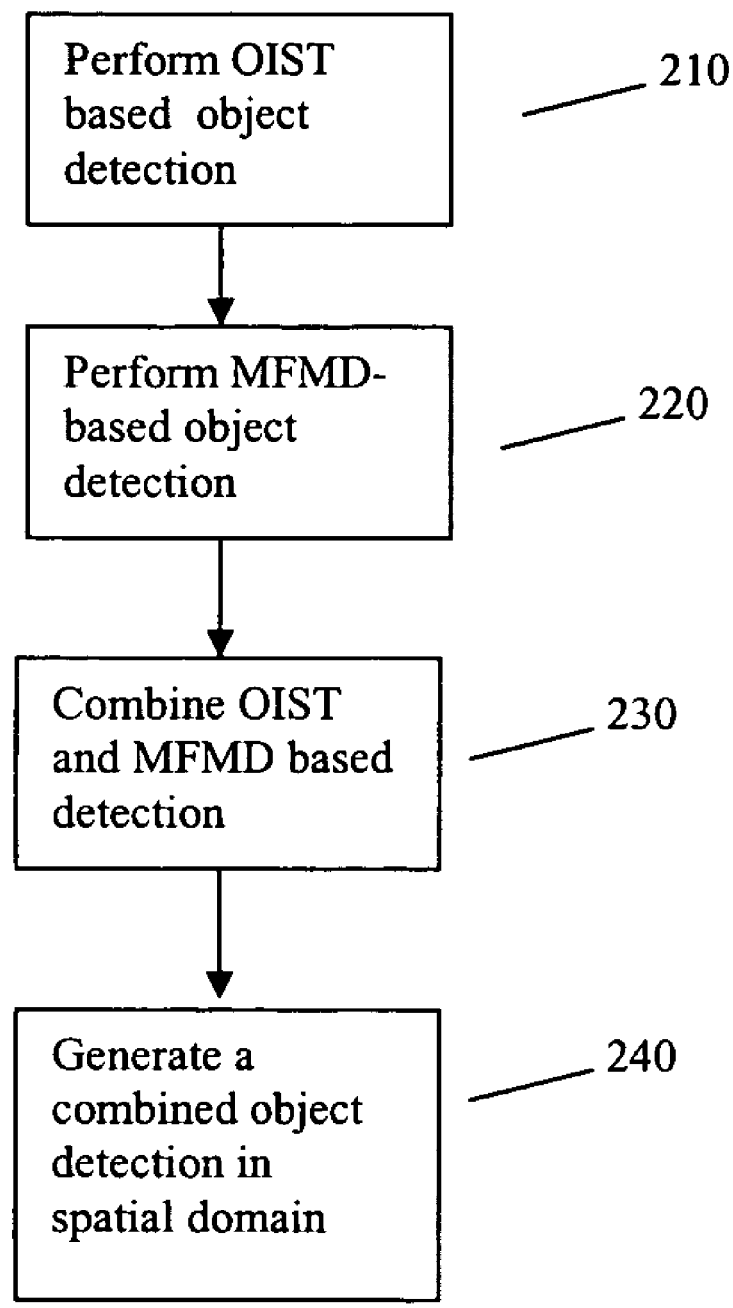
FIG. 2 is a flowchart of an exemplary process for spatial domain lesion detection, according to an embodiment of the present invention.

FIG. 2 is a flowchart of an exemplary process for spatial domain lesion detection, according to an embodiment of the present invention. To perform spatial domain object detection, data sets (e.g., volumes or images) acquired at different times are processed individually. In one embodiment of the present invention, two transformations may be carried out with respect to each image. One is an OIST transformation, which is a subtracted intensity map of the same image size. The other is an MFMD transformation, yielding a texture map of the same image size containing, at each pixel, a transformed texture feature. In some embodiments, when the data set is a volume, the transformations are applied to each slice image contained in the volume.

Each of the transformations may assist detection of an object with different characteristics. For example, the OIST transformation may facilitate detecting an object or lesion that has a homogeneous intensity distribution that differs from the intensity values of an organ in which the object resides. For example, small liver lesions often appear to have a homogenous intensity distribution that differs from the intensity values of surrounding normal liver tissues. Lesions having such properties may be detected based on an OIST map. This is performed at 210 in FIG. 2. The MFMD transformation may facilitate detecting a lesion that has an inhomogeneous intensity distribution that may appear to be, e.g., textured. Lesions with such intensity features may be detected based on an MFMD map. This is performed at 220. Details related to OIST based object detection and MFMD based object detection are discussed with reference to FIGS. 3–4. In some embodiments, to be able to detect lesions of different intensity properties, an OIST based detection result may be combined, at 230, with an MFMD based detection result and this yields, at 240, a combined object detection result.

Figure 3:
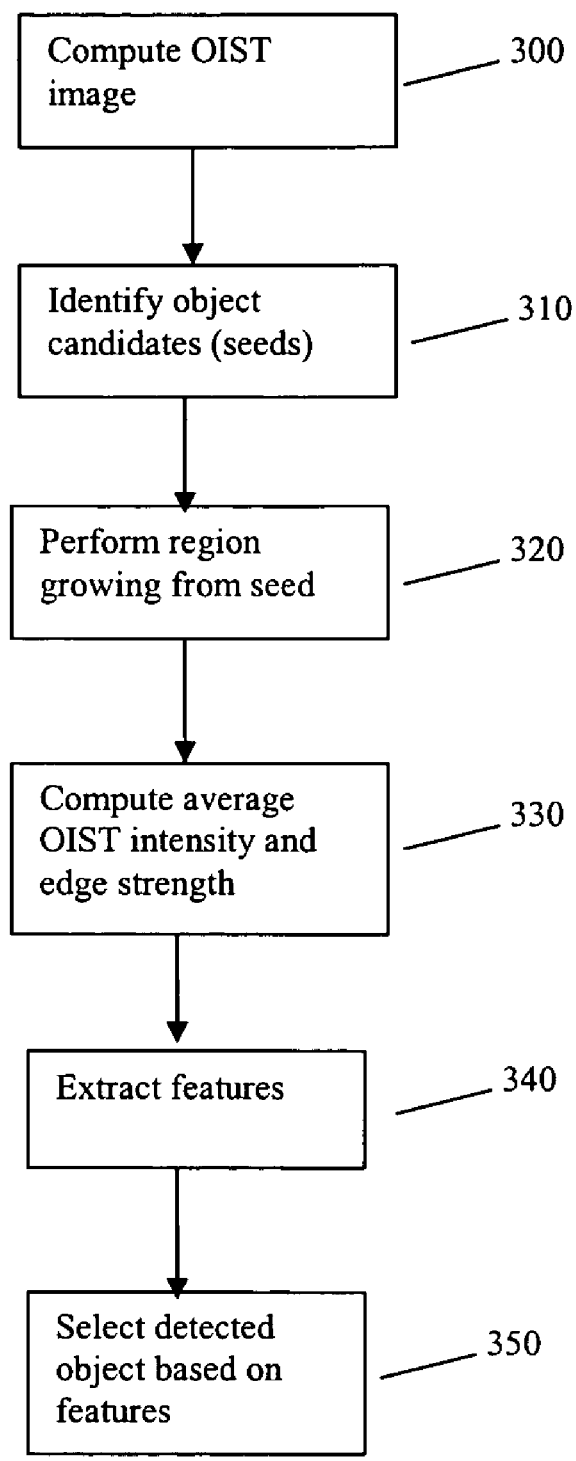
FIG. 3 is a flowchart of an exemplary process for organ intensity subtraction (OIST) based lesion detection, according to an embodiment of the present invention.

FIG. 3 is a flowchart of an exemplary process for OIST based lesion detection, according to an embodiment of the present invention. An OIST transformation is performed to compute an OIST map at 300. In some embodiments, an OIST image may be obtained by subtracting from the original intensity value at each pixel the average intensity of the organ in which detection is performed. For example, in CT liver volume images, the average liver CT value, which may be automatically derived by identifying a peak in the intensity histogram constructed from the image may be subtracted from the lesion intensity.

Based on the OIST image, one or more lesion candidates may be identified at 310. In one embodiment, when a liver lesion/cancer candidate is to be detected, localizing candidates of lesions may be achieved by identifying hypo- and hyper-dense areas based on OIST values in the OIST image. Pixels in a hypo-dense area may have a lower intensity value and pixels in a hyper-dense area may have a higher intensity value. In an OIST image, a pixel having a negative value may be considered as being from a hypo-dense area and a pixel having a positive value may be considered as being from a hyper-dense area. In one embodiment, each pixel in the OIST image may be classified as from a hypo-dense area, a hyper-dense area, or from neither type. A seed for a candidate may correspond to the center of a blob of pixels that correspond to either a hypo-dense or hyper-dense area and may be derived by computing, for example, a centroid of such an area.

To identify candidates for lesions, a region growing process is progressively performed, at 320, starting from each seed. At each growing step, an average OIST image intensity within the growing region and an average edge strength at a growing front may be computed at 330. In some embodiments, the edge strength of a pixel may be defined as the gradient magnitude at a pixel and a growing front may be defined as the boundary of the growing region. Different growing algorithms may be employed. In one embodiment, a spherical template may be employed where the boundary of the spherical template is the growing front. In a different embodiment, individual pixels may be grown based on a priority order of individual pixels. For example, pixels with a higher priority order may grow first. In some embodiments, such a priority order associated with each pixel may be computed based on the intensity value at the pixel. For example, for hypo-dense lesions, a higher priority order may be assigned to pixels that have a lower intensity value.

In some embodiments, one or more features may be extracted, at 340, based on region a growing result at each growing step. For example, an intensity profile and/or an edge strength profile and/or features thereof may be extracted and analyzed at each step of the region growing. Examples of such features include an average intensity level, overall intensity contrast, and the shape of the region. These dynamically computed features may be used, at 350, to determine or select candidates for lesions. Different criteria may be applied at 350 to determine which growing region corresponds to a lesion candidate. In some embodiments, knowledge-based rules may be evaluated with respect to extracted features. A region that fails to meet the criteria defined in the rules may be considered as non-lesions and may be removed from growing process.

In some embodiments, such knowledge-based rules may be generated based on domain specific knowledge. For example, if a target object is a liver lesion, expertise of physicians in terms of what features a liver lesion may possess may be translated to form knowledge-based rules and applied during region growing to exclude regions that do not have such features. Knowledge based rules may also be applied to determine when a region stops growing. For example, a region may stop grow when sharp intensity changes are detected, which may correspond to a peak in the edge profile that indicates a maximum intensity change. An assessment with respect to such an intensity change may be made based on whether an underlying region is a hypo-dense or a hyper-dense region. For a hypo-dense region, a maximum intensity change, which may coincide with the boundary of a lesion, corresponds to a rise in OIST value. For a hyper-dense region, a maximum intensity change occurring at a boundary point corresponds to a drop in OIST value. In some embodiments, rules that adopt criteria related to lesion shape, size, and interior contrast may also be used to filter out non-lesion candidates.

Figure 4:
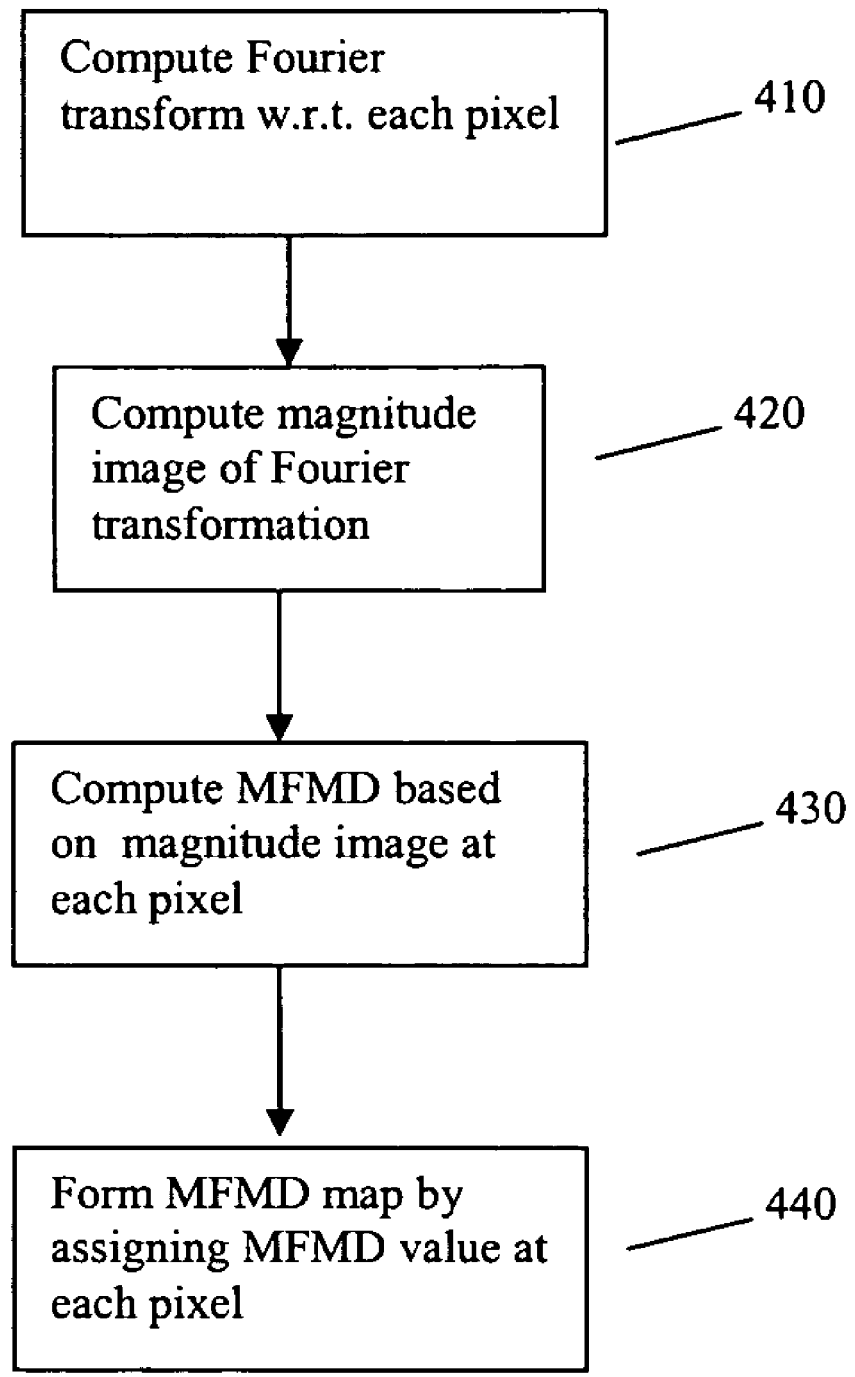
FIG. 4 is a flowchart of an exemplary process for computing a maximum frequency-magnitude difference (MFMD) map, according to an embodiment of the present invention.

As mentioned earlier, a MFMD map is used to facilitate detecting lesions that have inhomogeneous intensity distributions or lesions that appear to be textured. When an appropriate transformation is applied, an original image of such a textured lesion may be transformed into a map with homogeneous pixel values or with pixel values that are separable from those of non-lesion regions. A lesion detection method that detects a lesion having a homogeneous intensity distribution may then be applied to the transformed map to identify lesion regions. For example, an OIST based lesion detection approach as described herein may be applied to an MFMD map to detect lesions with inhomogeneous intensity distributions. FIG. 4 is a flowchart of an exemplary process for computing an MFMD map, according to an embodiment of the present invention. A Fourier transformation is applied, at 410, with respect to each pixel in a data set (volume or image) with a certain window size. For example, a window size of 16×16 may be used for a Fourier transformation operation. At 420, a magnitude for each of the Fourier transformations performed at a pixel may be computed.

Based on such computed information, an MFMD value for each pixel is computed at 430. An MFMD value may correspond to a numeric value representing a maximum frequency-magnitude difference across all frequency components. In some embodiments, such an MFMD value may be computed as a difference between a maximum magnitude and a minimum magnitude at a particular pixel location. For pixels in a region corresponding to, for example, normal liver tissue, MFMD values may be close to zero, i.e., the magnitudes indicating responses to frequencies with respect to the Fourier transformations are substantially at the same level. For pixels within a lesion with inhomogeneous intensity enhancement, the MFMD values may be substantially higher. Such computed MFMD values for pixels form, at 440, an MFMD map, to which a lesion detection method for homogeneous lesion regions, such as the OIST based detection, may be applied.

In some embodiments, OIST based lesion detection and MFMD based lesion detection may be carried out individually. Each may produce a set of lesion candidates. Each candidate may be represented by, for example, an image coordinate, indicating a center of a lesion, and/or some features characterizing the detected underlying lesion, which may include an estimated size, shape, intensity profile, or interior intensity contrast. In one embodiment, the detection results from both the OIST approach and the MFMD approach may be fused to produce a spatial domain lesion detection result. In some embodiments, such a fusion may be effectuated by performing an OR operation between two sets of detection results. For instance, when a candidate is present in one set but absent in the other, the integrated detection result may include the candidate. This may provide a more inclusive detection. In some situations, two candidates with one from each set may be close to each other in distance (e.g., measured according to image coordinates) even though they do not coincide with each other. This may lead to ambiguity as to whether the two candidates actually correspond to the same lesion. To determine whether this is the case, features associated with each may be used to make an assessment. For example, an estimated size or boundary may be used to determine whether the locations of both candidates are within a same lesion boundary. When this is the case, the two candidates from two sets of detection results may be merged to produce an updated candidate. For example, the image coordinate of this updated candidate may be the middle point of the two merged candidates.

Alternatively, the fusion may also be performed using an AND operation and a candidate from one detection result may be retained only when another candidate from the other detection result represents the same lesion. This may provide a more conservative detection outcome and the outcome of such a fusion scheme may provide a higher level of confidence with respect to the detection.

Lesion detection may also be performed in the temporal domain, in which there is a plurality of data set (a volume or an image) as a sequence acquired at different times or from different phases. Some types of lesions may exhibit certain patterns of changes along a sequence that is clinically significant in terms of diagnosis. For example, a liver lesion may exhibit intensity enhancement over time or across different phases. In those situations, a lesion may be detected when a known pattern of change across different data sets in a sequence is identified. For instance, when intensity enhancement is identified in corresponding regions from different phases, a lesion may be present.

Figure 5:
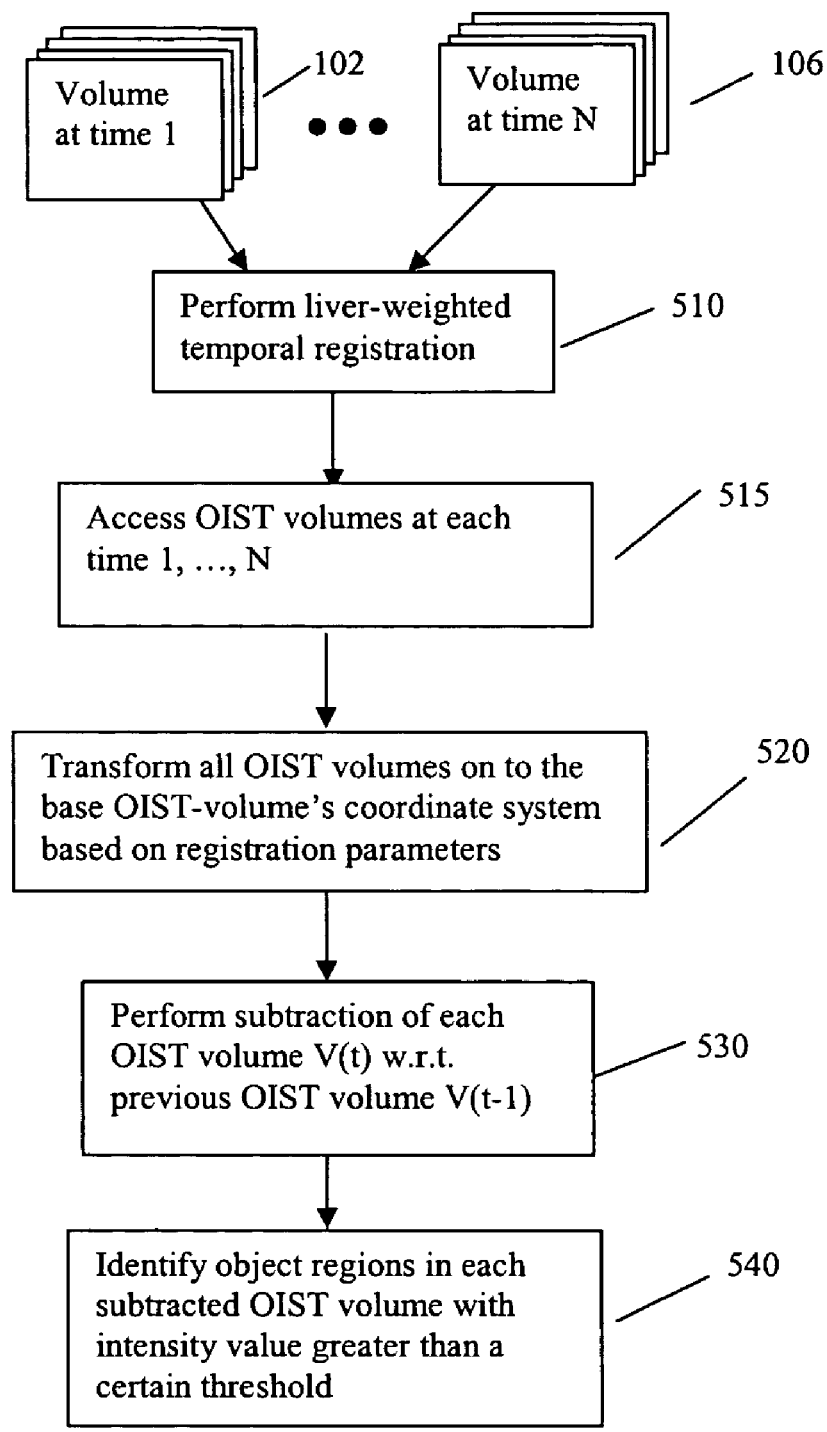
FIG. 5 is a flowchart of an exemplary process for temporal domain lesion detection according to an embodiment of the present invention.

FIG. 5 is a flowchart of an exemplary process for temporal domain liver lesion detection according to an embodiment of the present invention. In this exemplary process, lesion detection in the temporal domain may be performed by first registering, at 510, images/volumes across different phases with respect to a selected base image/volume. In some embodiments according to the present invention, an organ weighted registration method may be applied to derive parameters describing a motion between a base image/volume and a registering image/volume that can be used to undergo a movement of the image/volume in order to align with the base image/volume. Registration may be performed, at 520, between each of the image/volume in the sequence with respect to the selected base image/volume. Details related to the organ-weighted registration are discussed with reference to FIG. 6. When all images/volumes in the sequence align with each other, the registration parameters may be recorded. The OIST image/volumes may then be retrieved, at 515. The recorded registration parameters may be used to align the OIST image/volume across different phases, at 520. Subtraction may be carried out, at 530, between each pair of adjacent OIST images/volumes to obtain one or more subtracted OIST images/volumes. Lesion detection may then be performed, at 540, based on such obtained subtracted OIST images/volumes.

In some embodiments, if a subtracted value at a pixel in a subtracted OIST image/volume exceeds a certain threshold, it may indicate that it is within a lesion that exhibits intensity enhancement over time. When subtracted values at corresponding pixels of more than one subtracted OIST image/volume also exceed the threshold, it may provide stronger evidence that the pixel is within a lesion region. Lesion detection in the subtracted OIST images/volumes may be carried out individually or in an integrated manner. When detection is performed in each individual subtracted OIST image/volume, a classification decision (e.g., within or outside of a lesion) may be made locally without considering the subtracted values of its neighboring pixels in either the spatial or temporal neighborhood. In other embodiments, such a classification decision for each pixel may be made based on both the subtracted value at the pixel and the subtracted values at its neighboring pixels. For example, subtracted values across different phases may be used to establish a profile and analysis may be performed on the profile to examine whether it exhibits certain change patterns that fit the characteristics of a target lesion.

In some embodiments, when the target lesion to be detected is a liver lesion, intensity changes in the OIST images over time within a liver lesion may be measured in, for example, Housfield units. When an intensity change exceeds a certain number of Housfield units, it may be considered to be within a candidate region of liver lesions. Since similar intensity enhancement may also occur in other anatomical structures such as blood vessels, other information may be used to distinguish between a lesion and a non-lesion anatomy. In some embodiments, spatial information may be utilized in assessing whether a region detected with intensity enhancement corresponds to a liver lesion. Exemplary spatial information used for such a purpose may include measures related to shape or size of the region. Such information may be used to verify that a region detected to have intensity enhancement across phases also has an expected shape or size. Verification perform in this manner may exclude regions that have a shape and/or size that one will not expect from a lesion. For example, since the shape of a blood vessel is often curvilinear with a large aspect ratio while a lesion may be expected to have a relatively round and small aspect ratio, by comparing such measures, a blood vessel may be excluded as a candidate of a lesion.

In medical imaging, multiple phase images may be acquired in a time span of a few minutes, e.g. after contrast agent injection. During this period, an organ being imaged may move due to, for example, breathing or other types of movements of the subject. Such movements may cause the organ to shift or deform during different acquisition phases. Significant shift, e.g., more than 3 slices in a 5 mm slice thickness CT acquisition, may be observed. In those situations, registration based on geometric imaging parameters alone often does not yield an adequately satisfactory outcome. In the present invention, an organ-weighted registration technique is employed. In a preferred embodiment of the organ-weighted registration, a weight assigned to a pixel within a liver-like region is higher than a weight assigned to a pixel within a non-liver-like region.

Figure 6:
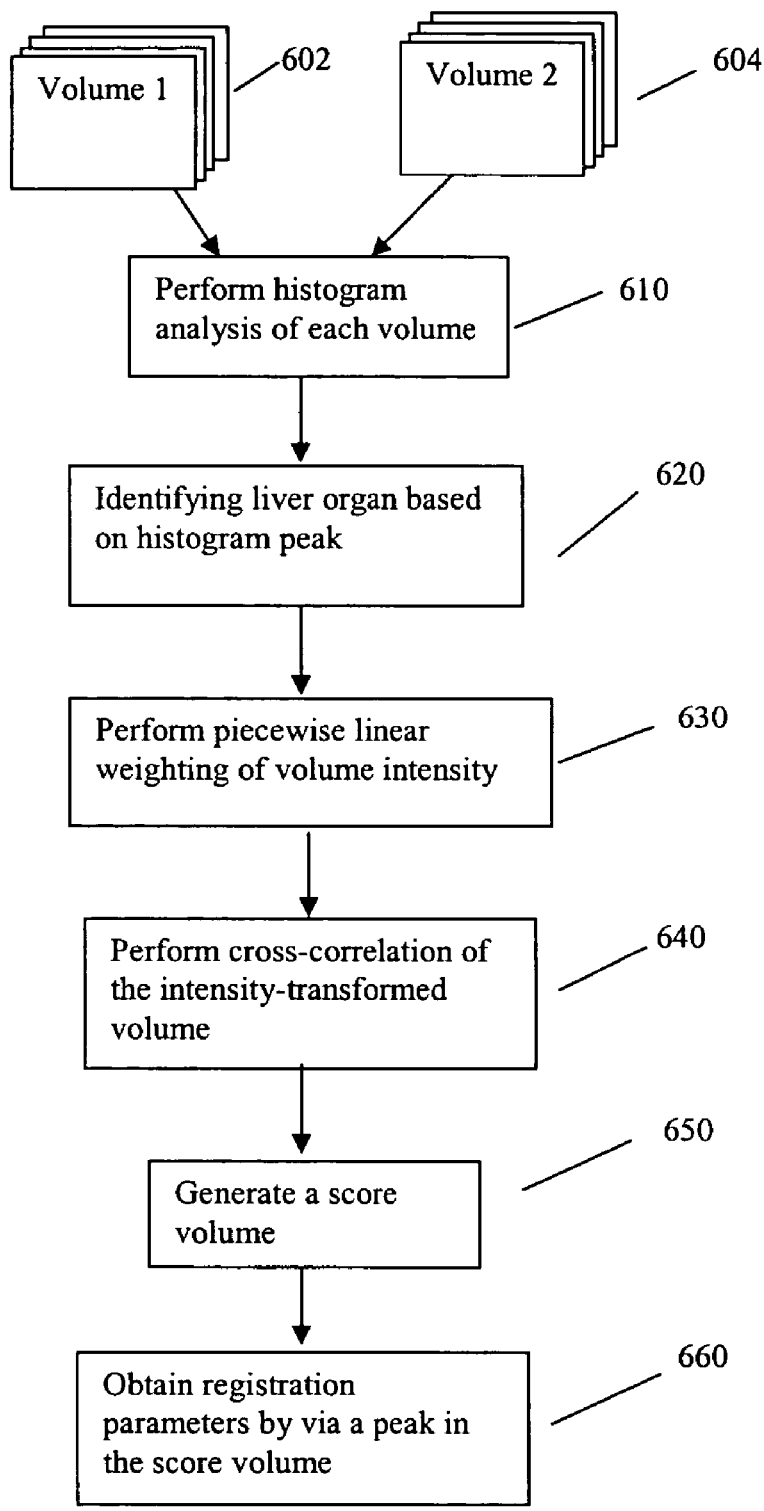
FIG. 6 is a flowchart of an exemplary process for organ weighted temporal data registration according to an embodiment of the present invention.

FIG. 6 is a flowchart of an exemplary process for organ-weighted temporal data registration according to an embodiment of the present invention. In this exemplary process, two volumes, volume 1 602 and volume 2 604, are to be registered. The exemplary registration process may also be applied to image registrations. For each volume to be registered, an intensity histogram may first be established and analyzed at 610. An organ (e.g., a liver) that substantially occupies the volume may be identified, at 620, by locating a peak in the histogram that corresponds to an intensity level at a substantial number of pixels. In some embodiments, a piece-wise linear function may be employed, at 630, to weight an intensity value at each pixel in the volume, such that a pixel that has an intensity value corresponding to the peak of the histogram is given a maximum weight, e.g., one. Accordingly, a pixel that has an intensity value corresponding to a non-peak location in the histogram may be given a weight that is inversely proportional to the distance between the underlying non-peak location to the peak location in the histogram. Different linear weighting functions may be employed to assign weights to pixels of different intensity values.

In some embodiments, based on the intensity-weighted volumes, a cross-correlation operation may be performed, at 640, to identify motion parameters between the two volumes. Such cross correlation operation between two volumes may be performed with respect to more than one translation position in order to search for a shift (or motion parameters) that yields a maximum cross correlation between the two volumes. A plurality of translation positions for which a cross correlation is computed may be determined based on the underlying application. For example, it may be assumed that a liver does not undergo a large motion between two adjacent phases. In a preferred embodiment, when a small motion is assumed between two volumes, a search range may be limited to a smaller window such as a 3×3×3 or a 5×5×5 region.

In some embodiments, for each pixel, with respect to each possible translation position in a given search range (e.g., a possible translation position (−1,0,0) in a volume indicates a translation with pixel to the left and with the same height and depth), a cross-correlation is computed to produce a cross correlation score. This may produce, at 650, a cross correlation score volume, with a depth corresponding to the number of possible translation positions searched at each pixel. In some embodiments, registration parameters for each pixel may be obtained, at 660, by identifying a maximum cross correlation score from all such scores associated with the pixel.

In some embodiments, images/volumes registered using an organ-weighted registration method may enable synchronized visualization of a sequence of images/volumes. For example, to visualize how a liver lesion has changed over time both in size and in density, underlying images containing the liver lesion may viewed side-by-side or be played as, for instance, a movie, that shows such changes through a plurality of registered images created based on liver weighted registration.

In some embodiments, object segmentation may further be performed with respect to each detected candidate. Segmentation may delineate the boundary of a lesion from surrounding non-lesion anatomy. An exemplary process for lesion segmentation is described herein that enables extraction of lesion boundaries for different types of lesions, including lesions with homogenous and inhomogeneous intensity distributions.

Figure 7:
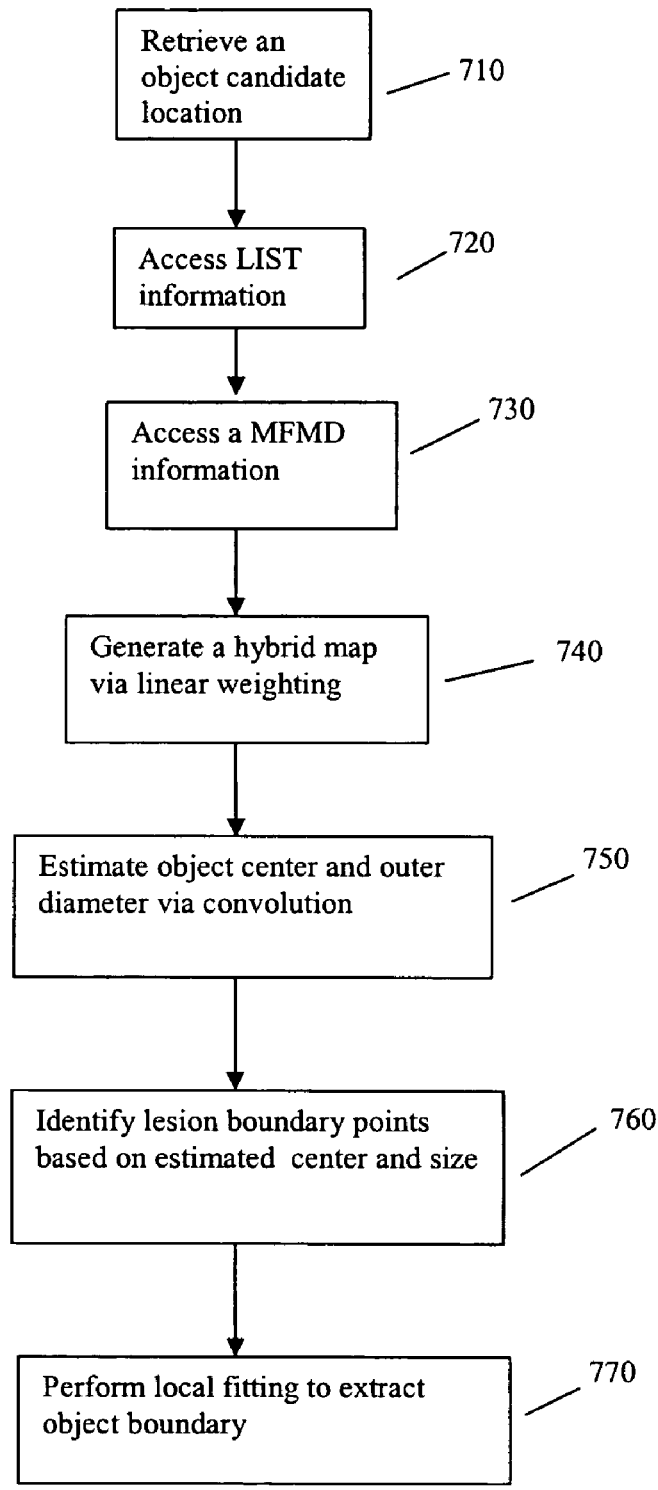
FIG. 7 is a flowchart of an exemplary process for object segmentation, according to an embodiment of the present invention.

FIG. 7 is a flowchart of an exemplary process for object segmentation, according to an embodiment of the present invention. In this exemplary process, a candidate representing an estimated object location is retrieved at 710. An OIST image and an MFMD map may be generated as described herein or accessed, at 720 and 730, respectively, when they have been computed, for example, during spatial domain object detection and have been retained. As described earlier, the OIST image may provide useful information that assists in distinguishing a lesion (e.g., in a liver) with a homogeneous intensity distribution from its surrounding (e.g., normal liver) tissue. The MFMD texture map may provide information that assists in recognizing a textured lesion.

In some embodiments, a hybrid map may be generated, at 740, based on the OIST map and the MFMD map. In an embodiment, the hybrid map is produced through linear weighting, where a normalized weight at each pixel of each map (OIST or MFMD) may be computed with respect to the maximum value in the map. The value at each pixel of the hybrid map may then be computed as a weighted sum of the pixel value in OIST and the pixel value in MFMD. Such a hybrid map may be used to estimate, at 750, a center and size of an underlying lesion. In some embodiments, to derive an estimated center and size of the underling lesion, various convolution operations may be carried out using one or more templates of a certain shape and of different sizes. Each convolution operation may yield a response. In some embodiments, convolutions may be applied at a plurality of pixel locations around the lesion candidate position. At each of such pixel locations, multiple convolution operations may be performed using, e.g., a spherical template with different radius measures. The center and the size of the underlying lesion may then be derived by identifying a maximum response from the convolution results.

In some embodiments, based on an estimated lesion center and size, a plurality of boundary points of the underlying lesion may be estimated, at 760, by identifying, e.g., in the hybrid map, the boundary points along a plurality of intensity profiles in certain radial directions initiated from the estimated lesion center. For example, substantial intensity drops/rises corresponding to transitions from the lesion area to normal liver tissue may be identified along each intensity profile. In some embodiments, such search may be constrained within a lesion boundary range, e.g., formed as a band determined based on the estimated size of the underlying lesion. Limitations may be enforced so that only drops/rises within the range may be identified as boundary points of the lesion. The number of intensity profiles may be determined as a fixed number or may be adaptively determined. For example, it may be determined in relation to the estimated size of the underlying lesion. The bigger the lesion size, the more intensity profiles being used for searching for boundary points. For instance, for a small lesion, radial directions may be every 15 degrees around the estimated center of the lesion. For a large lesion, it may be increased to every 5 degrees in order to identify a sufficient number of boundary points. Such detected boundary points may be used, e.g., as anchor points, to derive, at 770, a continuous lesion boundary. In some embodiments, a fitting operation may be applied to obtain a boundary. In other embodiments, a deformable-model fitting operation may be applied to minimize/maximize energy, e.g., with respect to, e.g., the hybrid map to derive an optimized lesion boundary.

FIGS. 8(*a*) and 8(*b*) show images at two slices of a region of interest containing a lesion. FIGS. 8(*c*) and 8(*d*) show corresponding lesion boundaries derived using the hybrid-map-based lesion segmentation approach described herein and superimposed on the original images.

Figure 9:
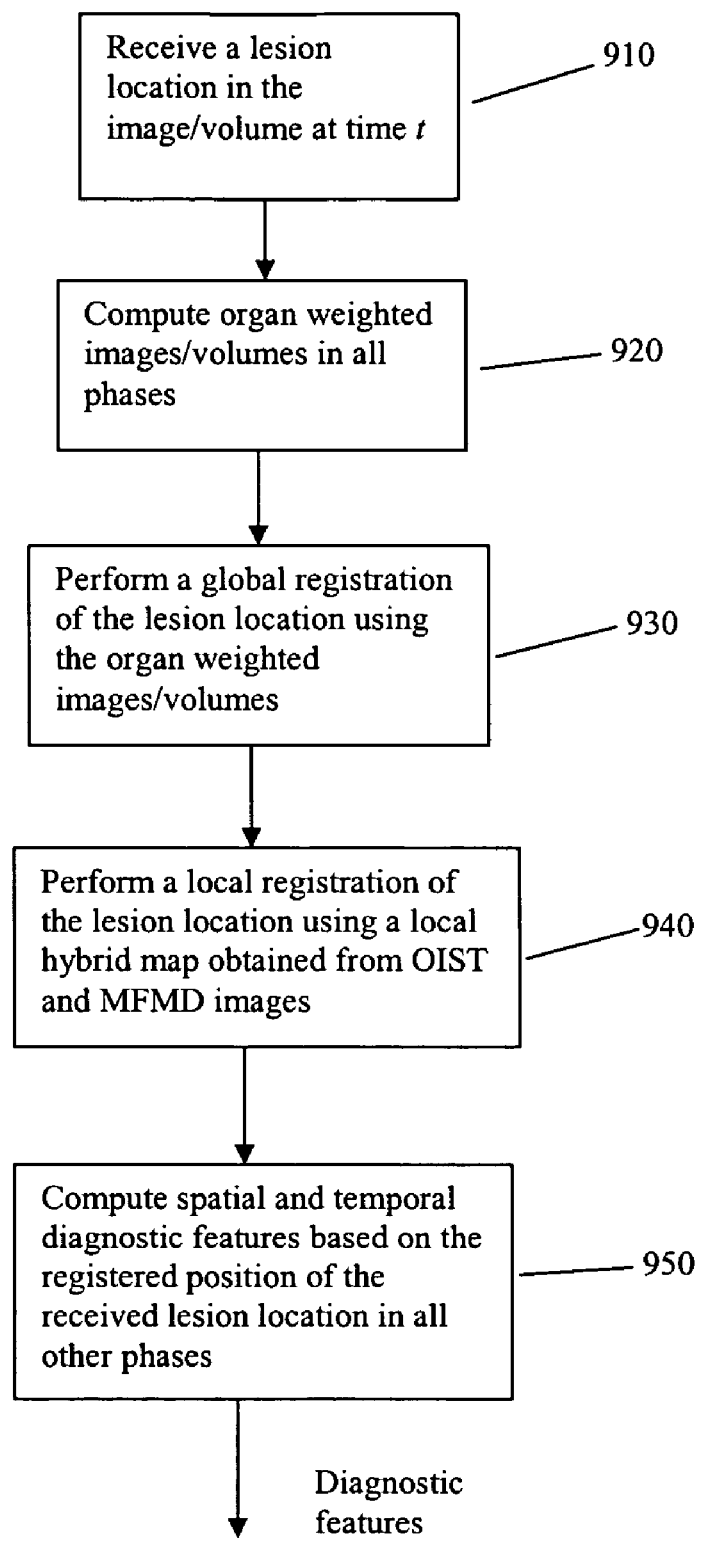
FIG. 9 is a flowchart of an exemplary process, in which diagnostic information is computed based on registered data sets, according to an embodiment of the present invention.

In some embodiments, a segmented lesion facilitates extraction of various types of diagnostic information, which may be crucial in assisting automated diagnosis and/or interactive diagnosis. Diagnostic information may be spatial or temporal. FIG. 9 is a flowchart of an exemplary process, in which spatial and temporal diagnostic information is computed based on registered data sets, according to an embodiment of the present invention. In this exemplary process, information related to a segmented lesion is received at 910. An organ-weighted version for all images in different phases may then be computed at 920. A global registration may be performed at 930 to first align a lesion in different phases (e.g., to compensate rigid component of motion) by using the organ weighted images. A local registration may be further performed, at 940, to align different areas of the lesion (e.g., to compensate for deformable component of motion) based on a hybrid map obtained by fusing the OIST image and MFMD image, as described herein.

In some embodiments, spatial diagnostic information may also be automatically extracted at 950. Such spatial information may include, but not be limited to, a lesion size, a lesion shape, characterization of the intensity difference of the lesion from the normal liver, the sharpness of the lesion boundary intensity transition, presence of a central scar within a lesion, presence of lower-intensity regions within the lesion, distribution of lower-intensity regions within a lesion, presence of nodule-within-nodule configuration, presence of hypo-dense or hyper-dense ring, percentage of enhanced area within the lesion, or spatial relationship to other anatomies. Exemplary temporal diagnostic information may include an average intensity change of a lesion across different phases, a spatial distribution of intensity enhancement within the lesion, or enhancement patterns for a nodule-within-nodule configuration.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method for liver lesion detection, comprising:
   detecting a liver lesion in a spatial domain in each of a plurality of data sets based on a liver intensity subtracted (LIST) image and a maximum frequency-magnitude difference (MFMD) map created from the data set;
   detecting the liver lesion in a temporal domain across the plurality of data sets; and
   integrating a detection result from said detecting in the spatial domain with a detection result from said detecting in the temporal domain to generate an integrated detection result.

2. The method according to claim 1, wherein a data set includes at least one of a 2D image and a 3D volume.

3. The method according to claim 1, wherein the plurality of data sets are related in time and each of the data set is acquired at a different point in time.

4. The method according to claim 2, wherein said detecting in the spatial domain comprises:
   performing liver lesion detection based on the LIST image;
   performing liver lesion detection based on the MFMD map; and
   fusing a detection result from said detection in the LIST image and a detection result from said detection in the MFMD map to produce the detection result from the spatial domain.

5. The method according to claim 4, wherein said performing detection in the LIST image comprises:
   generating the LIST image, as a transformed image, based on the image and a liver intensity value associated with the image; and
   detecting a liver lesion from the transformed image.

6. The method according to claim 5, wherein the liver intensity value is estimated based on an intensity histogram constructed from the image.

7. The method according to claim 4, wherein said performing detection in the MFMD map comprises:
   generating the MFMD map as a transformed image; and
   detecting a liver lesion from the transformed image.

8. The method according to claim 7, wherein generating the MFMD map comprises:
   computing a plurality of Fourier transformations centered at each pixel of the image;
   computing a magnitude for each of the Fourier transformations with respect to each pixel of the image;
   selecting a maximum magnitude for each pixel;
   selecting a minimum magnitude for each pixel; and
   assigning a difference between the maximum magnitude and the minimum magnitude for each pixel in the image to a corresponding pixel in the MFMD map.

9. The method according to claim 5, wherein said detecting from the transformed image comprises:
   identifying a lesion candidate, wherein the lesion candidate is within a region having intensity values satisfying at least one pre-determined criterion;
   performing region growing initiated from the lesion candidate to produce a growing region;
   computing at least one feature associated with the growing region;
   repeating said performing and said computing until the at least one feature satisfies a certain condition.

10. The method according to claim 9, wherein the region containing the lesion candidate includes a hypo-dense area in the image that has intensity values higher than a first pre-defined threshold.

11. The method according to claim 9, wherein the region containing the lesion candidate includes a hyper-dense area in the image that has intensity values lower than a second pre-defined threshold.

12. The method according to claim 9, wherein the region containing the lesion candidate includes an area in the MFMD map that has intensity values substantially higher than a third pre-determined threshold.

13. The method according to claim 9, wherein said performing region growing is carried out based on a priority order assigned to each pixel in the growing region.

14. The method according to claim 13, wherein the priority order assigned to a pixel in the growing region is determined based on the intensity value of the pixel.

15. The method according to claim 9, wherein the at least one feature includes at least one of:
   an average intensity value within the growing region;
   an average edge strength for pixels defining the boundary of the growing region; and
   a contrast measure between the growing region and exterior region of the growing region.

16. The method according to claim 4, wherein said fusing includes an OR operation performed between the detection result from the LIST image and the detection result from the MFMD map.

17. The method according to claim 4, wherein said fusing includes merging a first lesion candidate in the detection result from the LIST image and a second lesion candidate in the detection result from the MFMD map.

18. The method according to claim 2, wherein said detecting the liver lesion in temporal domain comprises:
   registering each image with a base image selected from the plurality of images;
   detecting one or more liver lesion candidates based on an analysis of intensity enhancement across the registered images; and
   generating the detection result from the temporal domain.

19. The method according to claim 18, wherein said registering comprises:
   weighting each pixel value in the base image using a first weight derived based on a peak location of a first intensity histogram constructed from the based image to produce a liver weighted intensity value for the pixel;
   weighting each pixel value in the image using a second weight derived based on a peak location of a second intensity histogram constructed from the image to produce a liver weighted intensity value for the pixel;
   computing a plurality of correlation score images each of which corresponds to a positional translation, wherein each pixel in a correlation score image represents a cross correlation value computed based on a weighted intensity value of a first pixel in the base image and a weighted intensity value of a second pixel from the image and the translation shifts from the first pixel location to the second pixel location;
   deriving one or more registration parameters based on a highest cross correlation value in the correlation score images; and
   aligning the image with the base image using the registration parameters.

20. The method according to claim 18, wherein said detecting comprises:
   performing image subtraction between each pair of adjacent registered images to produce one or more subtracted images;
   identifying a region having an intensity enhancement across the one or more subtracted images; and
   deriving a lesion candidate corresponding to the region if the intensity enhancement of the region satisfies at least one temporal criterion.

21. The method according to claim 1, further comprising verifying the detection result from the spatial domain using the detection result from the temporal domain.

22. The method according to claim 21, wherein said verifying the detection result from the spatial domain comprises:
   identifying intensity enhancement of each lesion candidate included in the detection result from the spatial domain; and
   confirming that the intensity enhancement of the lesion candidate satisfies at least one temporal criterion.

23. The method according to claim 1, further comprising verifying the detection result from the temporal domain using the detection result from the spatial domain.

24. The method according to claim 23, wherein said verifying the detection result from the temporal domain comprises:
   identifying at least one spatial feature of each lesion candidate included in the detection result from the temporal domain;
   confirming that the at least one spatial feature associated with the lesion candidate satisfies at least one spatial criterion.

25. The method according to claim 24, wherein the at least one spatial feature includes a size associated with a region surrounding the lesion candidate, and/or shape of the region.

26. The method according to claim 1, wherein said integrating includes performing an OR operation between the detection result from the spatial domain and the detection result from the temporal domain.

27. The method according to claim 1, wherein said integrating includes merging a first lesion candidate in the detection result from the spatial domain and a second lesion candidate in the detection result from the temporal domain.

28. The method according to claim 1, further comprising segmenting the liver lesion, which comprises:
   integrating the LIST image with the MFMD map to generate a hybrid map;
   convolving the hybrid map with at least one template;
   estimating a center and a size of the liver lesion based on the convolving results; and
   extracting boundary of the liver lesion to generate a segmented liver lesion.

29. The method according to claim 28, wherein a template used for convolution has a spherical shape.

30. The method according to claim 29, wherein each template used for convolution has a different size.

31. The method according to claim 28, wherein said extracting comprises:
   searching for a boundary point of a substantial intensity change along each of a plurality of radial lines initiated from the center of the liver lesion; and
   generating the boundary based on boundary points identified along the radial lines.

32. The method according to claim 28, further comprising extracting diagnostic information associated with the segmented liver lesion.

33. A method for detecting a lesion, comprising:
   detecting a lesion in a spatial domain in each of a plurality of data sets based on an organ intensity subtracted (OIST) image and a maximum frequency-magnitude difference (MFMD) map created from the data set;
   detecting the lesion in a temporal domain across the plurality of data sets; and
   integrating a detection result from said detecting in the spatial domain with a detection result from said detecting in the temporal domain to generate an integrated detection result.

34. The method according to claim 33, wherein said detecting the lesion in the temporal domain is performed via registering the plurality of data sets using an organ-weighted registration scheme.

35. The method according to claim 33, further comprising:
   the detection result from the spatial domain is verified using the detection result from the temporal domain; and
   the detection result from the temporal domain is verified using the detection result from the spatial domain.

36. The method according to claim 33, further comprising performing segmentation with respect to a lesion included in the integrated detection result.

37. The method according to claim 36, further comprising extracting spatial and/or temporal diagnostic information based on the integrated detection result.

38. A system for detecting a liver lesion, comprising:
   a spatial domain detection unit capable of detecting a liver lesion in a spatial domain in each of a plurality of data sets based on a liver intensity subtracted (LIST) image and a maximum frequency-magnitude difference (MFMD) map;

a temporal domain detection unit capable of detecting the liver lesion in a temporal domain across the plurality of data sets; and a spatial-temporal integrated detection unit capable of integrating a detection result from the spatial domain detection unit with a detection result from the temporal domain detection unit to generate an integrated detection result.

39. The system according to claim 38, further comprising:

an LIST generation unit capable of constructing an LIST image for each of the data sets; and an MFMD generation unit capable of constructing an MFMD map for each of the data sets.

40. The system according to claim 38, wherein the spatial domain detection unit comprises:

an LIST based detection unit capable of detecting a liver lesion in a data set based on an LIST image constructed with respect to the data set;

an MFMD based detection unit capable of detecting a liver lesion in a data set based on an MFMD map constructed with respect to the data set;

a fusion unit capable of combining a detection result from the LIST based detection unit and a detection result from the MFMD based detection unit to generate a spatial domain detection result.

41. The system according to claim 38, wherein the temporal domain detection unit comprises:

a liver-weighted registration unit capable of registering the plurality of data sets by weighting the data set values in a liver-weighted scheme;

a lesion detection unit capable of detecting one or more liver lesion candidates based on an analysis of intensity enhancement across the registered data sets; and generating a temporal domain detection result.

42. The system according to claim 38, further comprising:

a temporal domain verification unit capable of verifying the detection result from the spatial domain detection unit based on the detection result from the temporal domain detection unit; and a spatial domain verification unit capable of verifying the detection result from the temporal domain detection unit based on the detection result from the spatial domain detection unit.

43. The system according to claim 38, further comprising a segmentation unit capable of obtaining a boundary of a liver lesion included in the integrated detection result.

44. The system according to claim 38, further comprising a diagnostic information extraction unit capable of obtaining diagnostic information based on the integrated detection result.

* * * * *